(12) United States Patent
Spoerl et al.

(10) Patent No.: US 11,453,202 B2
(45) Date of Patent: Sep. 27, 2022

(54) THERMOFORMABLE DECORATIVE MATERIAL

(71) Applicant: Carl Freudenberg KG, Weinheim (DE)

(72) Inventors: Johanna Spoerl, Stuttgart (DE); Feng Li, Suzhou (CN); Arun Prasad Venugopal, Weinheim (DE); Klaus-Dietmar Wagner, Heddesheim (DE); Angela Weik, Bruehl (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 17/216,711

(22) Filed: Mar. 30, 2021

(65) Prior Publication Data
US 2021/0299998 A1    Sep. 30, 2021

(30) Foreign Application Priority Data

Mar. 31, 2020  (CN) .......................... 202010244510.9

(51) Int. Cl.
  *B32B 7/12* (2006.01)
  *B32B 5/02* (2006.01)
  *B32B 27/32* (2006.01)

(52) U.S. Cl.
  CPC ............... *B32B 7/12* (2013.01); *B32B 5/022* (2013.01); *B32B 27/32* (2013.01); *B32B 2260/021* (2013.01); *B32B 2260/046* (2013.01); *B32B 2262/0276* (2013.01); *B32B 2307/4026* (2013.01); *B32B 2307/702* (2013.01); *B32B 2307/738* (2013.01); *B32B 2605/003* (2013.01)

(58) Field of Classification Search
  CPC ..... B32B 7/12; B32B 27/32; B32B 2307/738; B32B 2307/702
  USPC ......................................... 428/195.1
  See application file for complete search history.

(56) References Cited

U.S. PATENT DOCUMENTS

| | | | |
|---|---|---|---|
| 2008/0145624 A1* | 6/2008 | Weikard | C08G 18/8175 428/195.1 |
| 2018/0264789 A1* | 9/2018 | Whitesell, Jr. | D04H 3/037 |
| 2019/0117040 A1 | 4/2019 | Knight | |

FOREIGN PATENT DOCUMENTS

| | | |
|---|---|---|
| DE | 102009023737 A1 | 12/2010 |
| EP | 2476561 A1 | 7/2012 |
| JP | 2013189000 A | 9/2013 |
| JP | 2014051268 A | 3/2014 |
| JP | 2016147409 A | 8/2016 |
| WO | WO 2018/170115 A1 | 9/2018 |

* cited by examiner

*Primary Examiner* — Betelhem Shewareged
(74) *Attorney, Agent, or Firm* — Leydig, Voit & Mayer, Ltd.

(57) ABSTRACT

A thermoformable decorative material for an automotive interior includes: a decorative layer including a textile substrate; a digitally printed design disposed on at least one side of the textile substrate and having dispersion ink and/or pigment ink; and an overlay adhesive coating applied to the digitally printed design. The overlay adhesive coating has an adhesive that includes polyurethane and/or polyacrylate.

20 Claims, 1 Drawing Sheet

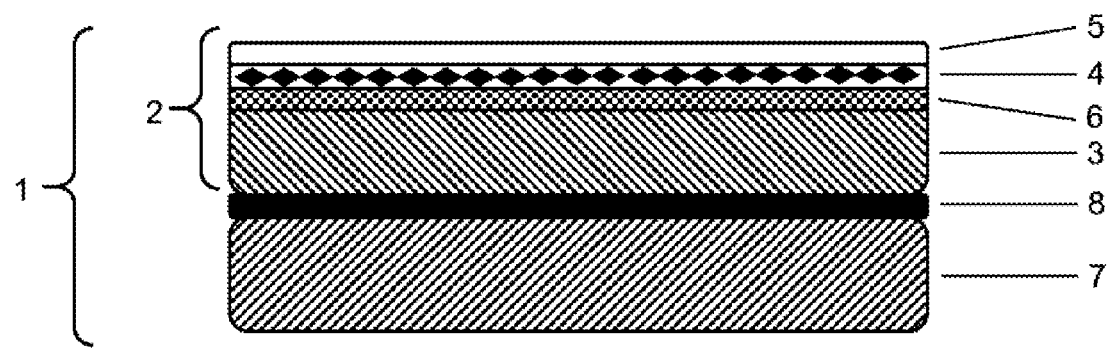

THERMOFORMABLE DECORATIVE MATERIAL

CROSS-REFERENCE TO PRIOR APPLICATION

Priority is claimed to Chinese Patent Application No. CN 202010244510.9, filed on Mar. 31, 2020, the entire disclosure of which is hereby incorporated by reference herein.

FIELD

The present invention relates to a thermoformable decorative material for automotive interior and a formed part manufactured therefrom. The present invention also relates to a method for manufacturing a thermoformable decorative material and a use thereof in manufacturing a formed part, especially an automotive interior part.

BACKGROUND

Motor vehicle interior parts such as automotive roof linings and door interior are usually composed of a carrier layer and a decorative layer. The decorative layer is usually constructed as a film or textile, where the carrier layer and the decorative layer can be connected by an adhesive layer. The carrier layer may be composed of fiber-reinforced polypropylene comprising, for example, low-cost glass fibers or wood fibers as the reinforcing material. Alternatively, the carrier layer may be composed of rigid polyurethane foams or polyurethane sandwich panels. In addition, the carrier layer can be formed by back-pressing or back-spraying the decorative layer with a fiber-reinforced thermoplastic. The decorative layer may be in the form of a foil or a film, for example, made of polyurethane, polyvinylidene chloride, thermoplastic polyolefin, or an elastomer. A decorative structure may be embossed into the decorative layer. Alternatively, textiles such as machine-woven fabrics, knitted fabrics, and non-woven fabrics may be used, which may also be accomplished by embossing or printing a decorative structure and/or pattern. Polyester and polyolefin that can be spin-dyed are particularly suitable as a fiber material for forming the fabric decorative layer. In the prior art, for example, a screen printing or rotary screen printing method as described in JP2014051268A is used to print a textile with a printing paste.

A disadvantage of the screen printing or rotary screen printing method is that it has low flexibility regarding design changes and suffers from technical limitations regarding complex designs. In addition, small batches cannot be manufactured economically. The laminated material composed of the carrier layer, the decorative layer, and (if necessary) the adhesive layer can be formed into a three-dimensional geometric shape under the action of heat and (if necessary) pressure. The lamination of these layers can only be achieved in the forming step. Methods such as thermoforming, vacuum forming, and mold pressing can be used for forming.

WO2018/170115 discloses a decorative non-woven laminate material, which includes a first non-woven fabric and a second non-woven fabric, the first non-woven fabric having a polymer film on one side. The non-woven fabric also has a colorant, which is preferably applied by screen printing. In order to improve the durability of the printed surface layer, a surface coating made of, for example, a thermoplastic elastomer, thermoplastic olefin, polyurethane, high-density polyethylene, polypropylene, or glycol-modified polyethylene terephthalate (PETg), or a combination thereof can be applied to the first non-woven fabric. The decorative non-woven laminate material can be formed into a three-dimensional geometric shape by a process such as thermoforming, mold pressing, and vacuum forming under the action of heat and (if necessary) pressure. A disadvantage of the non-woven laminate material is that the screen printing method is very expensive because for each design and each color to be printed, a separate screen template with a limited lifetime must be manufactured. Therefore, multi-color patterns and small batches cannot be manufactured economically. In addition, especially in the case of a pattern with a fine outline, the template is easily affected by a screen structure partially blocked by particles from, for example, the printing paste. This may cause an error in the printed image and can be compensated to a limited extent by thoroughly cleaning the screen.

Another disadvantage is the use of a thermoplastic in the surface coating: if the non-woven laminate material is deep-drawn and heated for further processing, the thermoplastic surface coating will also melt. This destroys the coating and contaminates the tool used in contact with the non-woven laminate material. In addition, especially when polyolefin is used as the surface coating, there is a risk that the non-polar surface coating will not sufficiently adhere to the printed surface of the first non-woven fabric which usually has polar characteristics. This may cause the two components to delaminate. The thermoplastic surface coating also has a negative impact on the textile feel of the decorative layer, as it forms a smooth film-like surface.

EP2476561A1 describes an interior wall covering especially for a caravan and a mobile home, in which the interior wall covering is made of at least one flat or slightly curved plate-shaped covering element directly connected to the wall, the plate-shaped covering element has a thickness of 2 to 12 mm, contains 20 to 80 vol % of air voids, has a density of less than 1.0 g/cm$^3$, and is composed of a polypropylene matrix and reinforcing fibers, where the plate-shaped covering element is connected to a non-woven fabric, a fabric, or a film, and a color pigment is used for printing in the sublimation printing process.

A disadvantage of this interior wall covering is that, it is limited to a flat or slightly curved plate and does not have a more complicated structure, such as a depression that can realize a holding groove (Griffmulden). During the sublimation printing process, the use of a transfer paper or transfer film is also disadvantageous, as the transfer paper or transfer film is discarded as waste after decoration transfer. In addition, it is known to those skilled in the art that due to the nature of sublimation ink, the sublimation ink cannot tolerate the light resistance and long-term temperature conditions or temperature and humidity conditions required for automotive interior, resulting in color change or fading, and/or reduced edge sharpness of the design due to the infiltration from the decorative layer to adjacent areas.

DE102009023737A1 describes a composite material, comprising: a) a carrier and b) at least one flat textile sheet laminated on at least one of two sides of the carrier, where the flat textile sheet has at least one adhesive, preferably an adhesive in B-stage, and can be provided with a functional material, and decoration can be provided to the flat textile sheet by digital printing before lamination. The term "B-stage" means that the adhesive has dried and no longer comprises any solvent, but has not yet fully cured. The printed layer may be provided with a protective layer. The layer used to protect the printed layer is varnish, such as powder varnish, transparent varnish, and transparent varnish, preferably scratch-resistant varnish, or other coating, such as a polyurethane thermal coating which prevents mechanical influences or resists UV aging. One disadvantage of the use of the varnish or polyurethane thermal coating is that they have a negative impact on the fabric feel of the flat sheet. In addition, they are not suitable for the subsequent thermal deformation step.

As mentioned above, digital printing is also a common method of printing on a decorative layer. Compared with the screen printing method, advantages of digital printing are that: design changes have greater flexibility, maintenance and cleaning tasks require a shorter time, it is possible to achieve multi-color, exquisite and delicate patterns with high quality, and small batch production can be performed economically. Since there is no direct contact between the printing tool and the substrate to be printed in digital printing, compared with the screen printing method, defects caused by, for example, blocking of the screen by fibers or particles from the substrate are avoided.

Since the digital printing method uses a much smaller amount of ink compared to the screen printing method, the sustainability of the digital printing process is greatly improved due to the use of a smaller amount of chemicals.

So far, it has not been possible to convert decorative non-woven fabrics printed by digital printing and/or their laminate materials into three-dimensional geometric shapes (e.g., the three-dimensional geometric shapes for interior parts, such as roof linings and door interiors in automobiles) by a forming process such as thermoforming without losing the quality of the digitally printed designs. The forming process may significantly stretch the printed image (usually between 1% and 100%), which means that the printed image will be destroyed due to the smaller amount of ink compared with screen printing. For this reason, the textile substrate on which the printed article is applied subsequently appears on the surface of the decorative layer, and the design and pattern are no longer recognizable or lose the decorativeness and attractiveness thereof.

SUMMARY

In an embodiment, the present invention provides a thermoformable decorative material for an automotive interior, comprising: a decorative layer comprising a textile substrate; a digitally printed design disposed on at least one side of the textile substrate and having dispersion ink and/or pigment ink; and an overlay adhesive coating applied to the digitally printed design, wherein the overlay adhesive coating has an adhesive comprising polyurethane and/or polyacrylate.

BRIEF DESCRIPTION OF THE DRAWINGS

The present invention will be described in even greater detail below based on the exemplary FIGURES. The invention is not limited to the exemplary embodiments. Other features and advantages of various embodiments of the present invention will become apparent by reading the following detailed description with reference to the attached drawings which illustrate the following:

FIG. 1 shows decorative material 1 according to the present invention.

DETAILED DESCRIPTION

In an embodiment, the present invention provides a thermoformable decorative material for automotive interior, which at least partially overcomes the above-mentioned disadvantages. In particular, the decorative material should be capable of being digitally printed, but can still be thermoformed into a three-dimensional geometric shape, for example, an interior part in an automobile, such as a roof lining and door interior, without losing the visual attractiveness of the printed article. This means that during the forming process, although the deformation of the decorative material that occurs in some places or on the whole interior part will cause the design or pattern to elongate, the printed layer will basically not be torn, so the design remains clearly visible.

In an embodiment, the present invention provides a thermoformable decorative material for automotive interior, comprising a decorative layer, where the decorative layer comprises a textile substrate, a digitally printed design disposed on at least one side of the textile substrate and having dispersion ink and/or pigment ink, and an overlay adhesive coating applied to the digitally printed design, where the overlay adhesive coating has an adhesive comprising polyurethane and/or polyacrylate.

Unexpectedly, it is found according to the present invention that, the use of polyurethane and/or polyacrylate as an adhesive in the overlay adhesive coating applied to the digitally printed design makes it possible to obtain a decorative material that can be deformed under the action of temperature and pressure without adversely affecting the digitally printed design.

Without being limited to a certain mechanism, it is speculated that this situation occurs because polyurethane and/or polyacrylate can seal and stabilize the digitally printed design particularly well. In addition, due to their low glass transition temperature, they can maintain their stabilizing effect even during the thermoforming.

According to the present invention, the term "applied to a digitally printed design" means that a textile substrate is first provided with a digitally printed design, and then an overlay adhesive coating is coated thereon.

For example, compared with the screen-printed design, an advantage of using the digitally printed design is that it is particularly easy to produce multi-color designs. In addition, fine patterns and structures can be replicated well. Another advantage is that the repeat length of the design is not limited in principle. Other procedural advantages are shorter downtime and debugging time required for design changes, and shorter maintenance time as well. Another advantage of the digitally printed design is its low fixed cost of manufacturing. It is also advantageous that, in contrast to screen printing, in the digitally printed design, there is no direct contact between the substrate to be printed and the printing tool. On the one hand, the printing tool can be prevented from being contaminated by fibers or particles from the substrate, and on the other hand, the decorative material can be prevented from being contaminated by heavy metals (e.g., nickel) from the screen. Another advantage of the digital printing method is that it uses a smaller amount of ink compared to the amount of a printing paste used in screen printing.

In a preferred embodiment, the digitally printed design is a design printed directly on the textile substrate, that is, a design not applied by a transfer printing method. An advantage of this is that sublimation-resistant ink may be used, and this ink has the light resistance required for the automotive interior and can tolerate long-term temperature conditions or temperature and humidity conditions. Therefore, there will be no color change or fading, and/or reduction in the edge sharpness of the digitally printed design due to the infiltration from the decorative layer to adjacent areas.

According to the present invention, the term "thermoformable" means that the decorative material can be transformed into a desired shape under the action of heat and pressure.

According to the present invention, the "textile substrate" should be understood as a flat sheet comprising fibers. According to the present invention, the fiber should be understood to mean a short fiber having a length of preferably 2 to 120 mm or a filament (i.e., a fiber with an unlimited length in theory). The textile substrate may be a machine-woven fabric, woven fabric, knitted fabric, and/or non-woven fabric. The preferred textile substrate is a non-woven fabric.

According to the present invention, the term "digital printing" should be understood to mean the printing of a design on a substrate by means of a digital printing template. The preferred digital printing method is inkjet printing and/or valve jet printing.

A variety of designs can be used as digitally printed designs, for example graphic patterns, such as diamonds, lines, and dots, and pictures. The design can be monocolored or multicolored. The weight per unit area of the digitally printed design is preferably less than 10 $g/m^2$, e.g., 0.01 to 10 $g/m^2$, more preferably less than 5 $g/m^2$, e.g., 0.05 to 5 $g/m^2$, and especially less than 1 $g/m^2$, e.g., 0.1 to 1 $g/m^2$.

The digitally printed design can be applied to one or both sides of the textile substrate.

According to the present invention, the decorative layer has an overlying adhesive coating comprising polyacrylate and/or polyurethane. An advantage of the aforementioned polymers is that they are particularly soft and flexible.

According to the present invention, polyacrylate should be understood to mean a polymer prepared from an ester of acrylic acid. Preferred esters of acrylic acid are methyl acrylate, ethyl acrylate, and/or butyl acrylate. The polyacrylate may be present in the form of pure acrylate, that is to say, it is only prepared from an ester of acrylic acid; or in the form of an acrylate copolymer, i.e., a copolymer of an ester of acrylic acid with other monomer, e.g., butadiene, acrylonitrile, and/or styrene.

According to the present invention, polyurethane is understood as a polymer prepared from a polyol and polyisocyanate. The polyol is preferably selected from a polyester polyol, a polyether polyol, and/or a polycarbonate polyol.

The proportion of polyacrylate and/or polyurethane in the overlay adhesive coating is preferably at least 50 wt %, more preferably at least 80 wt %, and especially at least 90 wt %.

The adhesive is preferably polyacrylate and/or polyurethane applied in a polymerized or partially polymerized form.

The adhesive is further preferably polyacrylate and/or polyurethane applied in a cold state (i.e., below 50° C.).

In a preferred embodiment of the present invention, polyacrylate has a glass transition temperature of less than 0° C., e.g., −30° C. to 0° C., more preferably less than −5° C., e.g., −20° C. to −5° C., and especially less than −10° C., e.g., −15° C. to −10° C., measured according to DIN EN ISO 11357-2 (2014, heating rate: 20 K/min).

In a preferred embodiment of the present invention, polyurethane has a glass transition temperature of less than 0° C., e.g., −30° C. to 0° C., more preferably less than 5° C., e.g., −20° C. to −5° C., and especially less than −10° C., e.g., −15° C. to −10° C., measured according to DIN EN ISO 11357-2 (2014, heating rate: 20 K/min).

The overlay adhesive coating may also comprise an additive such as a primer, a dye, a color pigment, a foaming aid, a thickener, and a dispersant.

In a preferred embodiment of the present invention, the overlay adhesive coating has a weight per unit area of 0.5 to 200 $g/m^2$, more preferably 1 to 150 $g/m^2$, even more preferably 5 to 100 $g/m^2$, and especially 8 to 50 $g/m^2$.

The textile substrate may have a weight per unit area of 25 to 1200 $g/m^2$, more preferably 50 to 800 $g/m^2$, even more preferably 100 to 500 $g/m^2$, and especially 150 to 300 $g/m^2$. With these weights per unit area, it is possible to achieve a particularly uniform surface in the formed structure, without violent stretching which causes the textile substrate to be torn apart and the underlying layers to be exposed.

The textile substrate is preferably a non-woven fabric, and in particular a non-woven fabric according to DIN EN ISO 9092 (2019). The non-woven fabric is preferably configured as a water jet-reinforced and/or needle punching-reinforced carded fiber web and/or air-laid non-woven fabric.

Also particularly suitable textile substrates are spunbond non-woven fabrics, wet-laid non-woven fabrics, and/or meltblown non-woven fabrics, and/or combinations with the aforementioned textile substrates.

Carded needle-punched non-woven fabrics are preferred as they have good homogeneity and mechanical properties. The textile substrate preferably has fibers containing the following as main ingredients: polyester, especially polyethylene terephthalate; polyolefin, especially polyethylene and/or polypropylene; and polyamide and/or polyacrylic, especially polyacrylonitrile (greater than 50 wt %, and preferably greater than 90 wt %, based on the total weight of the fibers). Polyesters are particularly preferred as they have high heat resistance, low flammability, and good ductility.

The textile substrate also preferably has short fibers, especially short fibers having a length of 2 to 120 mm, more preferably 5 to 100 mm, more preferably 10 to 80 mm, and especially 20 to 60 mm.

The textile substrate also preferably has fibers with a fineness of 0.5 to 10 dtex, more preferably 1 to 7 dtex, and especially 1.5 to 5 dtex.

The textile substrate may be composed of white or colored fibers, preferably spun-dyed fibers.

In another preferred embodiment of the present invention, the textile substrate has a base adhesive coating, which is applied to the textile substrate before the digitally printed design is applied.

If the digitally printed design is only applied to one side of the textile substrate, it is preferred to apply the base adhesive coating to the side of the textile substrate to which the digitally printed design will subsequently be applied.

The base adhesive coating preferably has polyacrylate and/or polyurethane as the adhesive. The polyacrylate and/or polyurethane may be the same as or different from the polyurethane and/or polyacrylate used in the overlay adhesive coating.

In a preferred embodiment of the present invention, the polyacrylate in the base adhesive coating still has a glass transition temperature of less than 0° C., e.g., −30° C. to 0° C., more preferably less than −5° C., e.g., −20° C. to −5° C., and especially less than −10° C., e.g., −15° C. to −10° C., measured according to DIN EN ISO 11357-2 (2014, heating rate: 20 K/min).

In a preferred embodiment of the present invention, the polyurethane in the base adhesive coating still has a glass transition temperature of less than 0° C., e.g., −30° C. to 0° C., more preferably less than −5° C., e.g., −20° C. to −5° C., and especially less than −10° C., e.g., −15° C. to −10° C., measured according to DIN EN ISO 11357-2 (2014, heating rate: 20 K/min).

The base adhesive coating may further comprise an additive, e.g., a primer, a foaming aid, a thickener, and a dispersant.

The decorative material may further comprise a carrier material. The carrier material is preferably arranged on the side of the textile substrate facing away from the digitally printed design. The textile substrate and the carrier material are preferably connected to each other via an adhesive layer. The adhesive layer preferably comprises polyethylene, polypropylene, and/or copolyamide. The adhesive layer may be configured as, for example, a powder, a hot melt film, or an adhesive net. The weight per unit area of the adhesive layer is preferably 1 to 200 g/m$^2$, preferably 5 to 150 g/m$^2$, and more preferably 10 to 50 g/m$^2$.

In a preferred embodiment, the decorative layer has a surface coating for preventing contamination.

If the decorative material has a carrier material, the surface coating is purposefully arranged on the side of the decorative layer facing away from the carrier material.

According to the present invention, the preferred pigment ink is selected from the group consisting of inorganic pigments and/or organic pigments, such as an azo pigment, an anthraquinone pigment, a benzimidazolone pigment, indigo, a dioxazine pigment, a quinacridone pigment, a quinophthalone pigment, a phthalocyanine pigment, an isoindoline pigment, an isoindolinone pigment, a perylene pigment, a perinon pigment, and/or a metal complex pigment, and/or a mixture thereof.

According to the present invention, the dispersion ink preferably has a dye selected from the group consisting of the following substances: an azo dye; an anthraquinone dye, such as hydroxyanthraquinone, nitroanthraquinone, and/or aminoanthraquinone; a quinophthalone dye; an azomethine dye; a stilbene dye; a methine dye; and/or a nitrodiarylamine dye; and/or a mixture thereof.

The pigment ink or dispersion ink may have other ingredients, such as a thickener, an adhesive, and a surfactant.

Another subject of the present invention includes a molded part made of the decorative material according to the present invention by thermoforming, especially an interior part in an automobile, such as an automotive roof lining, door interior, floor, accessory mat, cargo compartment mat, trunk lining, glove compartment lining, load floor, console panel and card pocket panel, seat back lining, and/or wheel cover.

The thermoformable decorative material according to the present invention can be manufactured by a method comprising the following steps:
a) providing a textile substrate;
b) applying a digitally printed design on at least one side of the textile substrate, where the digitally printed design has dispersion ink and/or pigment ink; and
c) applying an overlay adhesive coating on the digitally printed design, where the overlay adhesive coating has an adhesive comprising polyurethane and/or polyacrylate, thereby forming a decorative layer.

The statements made on the decorative material and its preferred examples also apply to preferred examples of the method of preparing the decorative material, especially regarding the textile substrate, the digitally printed design, and the overlay adhesive coating.

The digitally printed design is preferably applied by inkjet printing or valve jet printing.

An overlying adhesive coating containing the adhesive is applied to the digitally printed design. This can be performed, for example, by spray coating or foam coating.

The adhesive is preferably applied in a polymerized or partially polymerized form.

The adhesive is more preferably applied in a cold state, i.e., below 50° C.

Before the application of the digitally printed design, a base adhesive coating can be applied to the textile substrate. This can also be performed by, for example, spray coating or foam coating.

The surface coating can be applied to the decorative layer. This can also be performed by, for example, spray coating or foam coating.

The decorative layer obtained in the previous step can be bonded to the carrier material, for example, via an adhesive layer.

The decorative material obtained using the method according to the present invention can be formed into a molded part by thermoforming.

In one embodiment of the present invention, the molded part is made of a decorative material comprising no carrier material. In a preferred embodiment, the molded part is made of a decorative material comprising a carrier material. The thermoforming and the connection of the decorative layer to the carrier material can be achieved in one step. Alternatively, the decorative layer can be connected to the carrier material before the thermoforming.

Another subject of the present invention includes a use of the decorative material according to the present invention in manufacturing a molded part, especially an interior part in an automobile, such as an automotive roof lining, door interior, floor, accessory mat, cargo compartment mat, trunk lining, glove compartment lining, load floor, console panel and card pocket panel, seat back lining, and/or wheel cover.

Unless otherwise stated, the standards mentioned here are standard versions valid by the filing date.

FIG. 1 shows a decorative material 1 according to the present invention, comprising a decorative layer 2. The decorative layer 2 comprises a textile substrate 3, a digitally printed design 4 disposed on at least one side of the textile substrate 3 and having dispersion ink and/or pigment ink, and an overlay adhesive coating 5 applied to the digitally printed design 4, where the overlay adhesive coating 5 has an adhesive comprising polyurethane and/or polyacrylate. The textile substrate 3 further has a base adhesive coating 6 which is applied to the textile substrate 3 before the digitally printed design 4 is applied. The decorative material 1 further comprises a carrier material 7. The carrier material 7 is arranged on the side of the textile substrate 3 facing away from the digitally printed design 4. The textile substrate 3 and the carrier material 7 are connected to each other via an adhesive layer 8.

EXAMPLES

Example 1: Manufacture of a Decorative Material According to the Present Invention Using Pigment Ink A 10 wt % polyacrylate aqueous dispersion (a PLEXTOL BV 380 mixture, glass transition temperature: −11° C.) was spray-coated on the whole surface of a needle-punched non-woven fabric having a weight per unit area of 200 g/m$^2$ and composed of polyester fibers having a fineness of 2 to 4 dtex, and dried in a convection oven at 100° C. to 160° C. This resulted in a base adhesive coating. Pigment ink (DuPont ARTISTRI® P5100+Cyan, P5200+Magenta, P5300+Black) was used for inkjet printing to perform digital printing on the coating side in a diamond pattern. The resulting digitally printed design had a weight per unit area of 5 g/m². Then a 10 wt % polyacrylate aqueous dispersion (a PLEXTOL BV 380 mixture, glass transition temperature: −11° C.) was spray-coated on the whole surface of the printed side of the non-woven fabric. The spray-coated non-woven fabric was dried in a convection oven at a temperature of 100° C. to 160° C., and the remaining polyacrylate layer was cured. The resulting overlay adhesive coating had a weight per unit area of 10 g/m² and covered the whole surface of the digitally printed design. Due to the transparency thereof, the digitally printed design thereunderneath was still visible.

The formed decorative layer was then applied onto a carrier material. To this end, a 10 g/m² hot-melt adhesive layer in the form of an adhesive net was arranged on a polypropylene-glass fiber composite non-woven fabric, as the carrier material, having a weight per unit area of 800 g/m², and the decorative layer was placed thereon, with the printed side facing up. A tool was used in a 160° C. hot press to deform the layer structure into an automotive roof lining, in which the material was stretched to 100% at certain locations.

After the tool was removed, most of the decorative layer was shown to be retained, without being torn off due to stretching, and the pattern was still clearly legible. The textile feel was also retained.

Example 2: Manufacture of a Comparative Decorative Material without an Overlay Adhesive Coating Using Pigment Ink A 10 wt % polyacrylate aqueous dispersion (a PLEXTOL BV 380 mixture, glass transition temperature: −11° C.) was spray-coated on the whole surface of a needle-punched non-woven fabric having a weight per unit area of 200 g/m² and composed of polyester fibers having a fineness of 2 to 4 dtex, and dried in a convection oven at 100° C. to 160° C. This resulted in a base adhesive coating. Pigment ink (DuPont ARTISTRI® P5100+Cyan, P5200+Magenta, P5300+Black) was used for inkjet printing to perform digital printing on the coating side in a diamond pattern. The resulting digitally printed design had a weight per unit area of 5 g/m².

The printed non-woven fabric was then applied onto a carrier material. To this end, a 10 g/m² hot-melt adhesive layer in the form of an adhesive net was arranged on a polypropylene-glass fiber composite non-woven fabric, as the carrier material, having a weight per unit area of 800 g/m², and the printed non-woven fabric was placed thereon, with the printed side facing up. A tool was used in a 160° C. hot press to deform the layer structure into an automotive roof lining, in which the material was stretched to 100% at certain locations.

After the tool was removed, the digitally printed design was shown to be destroyed in the stretched area, so the pattern was no longer legible. After thermoforming, the visual attractiveness of the decorative layer no longer existed.

Example 3: Manufacture of a Decorative Material According to the Present Invention Using Dispersion Ink A 10 wt % polyacrylate aqueous dispersion (a PLEXTOL BV 380 mixture, glass transition temperature: −11° C.) was spray-coated on the whole surface of a needle-punched non-woven fabric having a weight per unit area of 200 g/m² and composed of polyester fibers having a fineness of 2 to 4 dtex, and dried in a convection oven at 100° C. to 160° C. This resulted in a base adhesive coating. Dispersion ink (Huntsman TERATOP® XKS HL) was used for inkjet printing to perform digital printing on the coating side in a diamond pattern. The resulting digitally printed design had a weight per unit area of 5 g/m². In order to fix the printed article on the non-woven fabric, the printed non-woven fabric was treated in a convection oven at 180° C. for 1-2 min, and at least a portion of the ink would penetrate into the polyester fiber structure. Then a 10 wt % polyacrylate aqueous dispersion (a PLEXTOL BV 380 mixture, glass transition temperature: −11° C.) was spray-coated on the whole surface of the printed side of the non-woven fabric. The spray-coated non-woven fabric was dried in a convection oven at 100° C. to 160° C., and the remaining polyacrylate layer was cured. The resulting overlay adhesive coating had a weight per unit area of 10 g/m² and covered the whole surface of the digitally printed design thereunderneath. Due to the transparency thereof, the digitally printed design thereunderneath was still visible.

The formed decorative layer was then applied onto a carrier material. To this end, a 10 g/m² hot-melt adhesive layer in the form of an adhesive net was arranged on a polypropylene-glass fiber composite non-woven fabric, as the carrier material, having a weight per unit area of 800 g/m², and the decorative layer was placed thereon, with the printed side facing up. A tool was used in a 160° C. hot press to deform the layer structure into an automotive roof lining, in which the material was stretched to 100% at certain locations.

After the tool was removed, most of the decorative layer was shown to be retained, without being torn off due to stretching, and the pattern was still clearly legible. The textile feel was also retained. The overlay adhesive coating also ensured that the thermally transferable dispersion ink remained on the non-woven fabric and would not be rubbed off onto the tool.

A scratch resistance test was performed on the obtained decorative material. It has been shown that even if there was no cleaning step (according to the prior art, a cleaning step must be performed when printing is performed directly with dispersion ink), the decorative material still had excellent scratch resistance. The textile feel was retained.

Example 4: Manufacture of a Comparative Decorative Material without an Overlay Adhesive Coating Using Dispersion Ink A 10 wt % polyacrylate aqueous dispersion (a PLEXTOL BV 380 mixture, glass transition temperature: −11° C.) was spray-coated on the whole surface of a needle-punched non-woven fabric having a weight per unit area of 200 g/m² and composed of polyester fibers having a fineness of 2 to 4 dtex, and dried in a convection oven at 100° C. to 160° C. This resulted in a base adhesive coating. Dispersion ink (Huntsman TERATOP® XKS HL) was used for inkjet printing to perform digital printing on the coating side in a diamond pattern. The resulting digitally printed design had a weight per unit area of 5 g/m². In order to fix the printed article on the non-woven fabric, the printed non-woven fabric was treated in a convection oven at 180° C. for 1-2 min, and at least a portion of the ink would penetrate into the polyester fiber structure.

The printed non-woven fabric was then applied onto a carrier material. To this end, a 10 g/m² hot-melt adhesive layer in the form of an adhesive net was arranged on a polypropylene-glass fiber composite non-woven fabric, as the carrier material, having a weight per unit area of 800 g/m², and the decorative layer was placed thereon, with the printed side facing up. A tool was used in a 160° C. hot press to deform the layer structure into an automotive roof lining, in which the material was stretched to 100% at certain locations.

After the tool was removed, the digitally printed design was shown to be destroyed in the stretched area, so the pattern was no longer legible. After thermoforming, the visual attractiveness of the decorative layer no longer existed. In addition, a portion of the dispersion ink was wiped off to the tool surface in contact with the digitally printed design. This situation became apparent only when a cellulose cloth impregnated with isopropyl alcohol was used to clean the tool surface.

A scratch resistance test was performed. It had been found that, the scratch resistance was significantly worse than the decorative material according to the present invention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A thermoformable decorative material for an automotive interior, comprising:
   a decorative layer comprising a textile substrate;
   a digitally printed design disposed on at least one side of the textile substrate and having dispersion ink and/or pigment ink; and
   an overlay adhesive coating applied to the digitally printed design,
   wherein the overlay adhesive coating has an adhesive comprising polyurethane and/or polyacrylate, and
   wherein the textile substrate has a base adhesive coating, which is applied to the textile substrate before the digitally printed design is applied.

2. The thermoformable decorative material according to claim 1, wherein the digitally printed design comprises a design printed directly on the textile substrate.

3. The thermoformable decorative material according to claim 1, wherein the adhesive comprises amorphous polyacrylate and/or polyurethane.

4. The thermoformable decorative material according to claim 1, wherein the polyacrylate and/or polyurethane has a glass transition temperature of less than 0° C. measured according to DIN EN ISO 11357-2 (2014, heating rate: 20 K/min).

5. The thermoformable decorative material according to claim 1, wherein the overlay adhesive coating has a weight per unit area of 0.5 to 200 g/m², measured according to DIN EN 12127: 1997-12.

6. The thermoformable decorative material according to claim 1, wherein the textile substrate comprises a non-woven fabric.

7. The thermoformable decorative material according to claim 1, wherein the textile substrate has fibers containing: polyester comprising polyethylene terephthalate; polyolefin, comprising polyethylene and/or polypropylene; and polyamide and/or polyacrylic comprising polyacrylonitrile.

8. The thermoformable decorative material according to claim 1, wherein the textile substrate has fibers with a fineness of 0.5 to 10 dtex.

9. The thermoformable decorative material according to claim 1, wherein the decorative material comprises a carrier material arranged on a side of the textile substrate facing away from the digitally printed design.

10. The thermoformable decorative material according to claim 1, wherein the base adhesive coating has polyacrylate and/or polyurethane as an adhesive, and
    wherein the polyacrylate and/or polyurethane are/is the same as or different from the polyurethane and/or polyacrylate used in the overlay adhesive coating.

11. A method, comprising:
    using the thermoformable decorative material according to claim 1 in manufacturing a molded part,
    wherein the molded part comprises an interior part in an automobile comprising an automotive roof lining, door interior, floor, accessory mat, cargo compartment mat, trunk interior, glove compartment interior, load floor, console panel and card pocket panel, seat back lining, and/or wheel cover.

12. A molded part, comprising:
    an interior part in an automobile,
    wherein the molded part comprises the decorative material according to claim 1 that has been thermoformed.

13. A method for manufacturing the thermoformable decorative material according to claim 1, comprising:
    a) providing the textile substrate;
    b) applying the digitally printed design on at least one side of the textile substrate, the digitally printed design having dispersion ink and/or pigment ink; and
    c) applying the overlay adhesive coating on the digitally printed pattern,
    wherein the overlay adhesive coating has the adhesive comprising polyurethane and/or polyacrylate so as to form a decorative layer.

14. The thermoformable decorative material according to claim 4, wherein the glass transition temperature is −30° C. to 0° C.

15. The thermoformable decorative material according to claim 6, wherein the non-woven fabric comprises a water jet-reinforced and/or needle punching-reinforced carded fiber web and/or air-laid non-woven fabric.

16. A thermoformable decorative material for an automotive interior, comprising:
    a decorative layer comprising a textile substrate;

a digitally printed design disposed on at least one side of the textile substrate and having dispersion ink and/or pigment ink; and an overlay adhesive coating applied to the digitally printed design, wherein the overlay adhesive coating has an adhesive comprising polyurethane and/or polyacrylate, wherein an inorganic pigment and/or organic pigment contained in the pigment ink are/is selected from a group consisting of: an azo pigment, an anthraquinone pigment, a benzimidazolone pigment, indigo, a dioxazine pigment, a quinacridone pigment, a quinophthalein pigment, a quinophthalone pigment, an isoindoline pigment, an isoindolinone pigment, a perylene pigment, a perinon pigment, and/or a metal complex pigment, and/or a mixture thereof, and/or wherein a dye contained in the dispersion ink is selected from a group consisting of: an azo dye, an anthraquinone dye comprising hydroxyanthraquinone, nitroanthraquinone, and/or aminoanthraquinone, a quinophthalone dye, an azomethine dye, a stilbene dye, a methine dye, and/or a nitrodiarylamine dye, and/or a mixture thereof.

17. The thermoformable decorative material according to claim 16, wherein the digitally printed design comprises a design printed directly on the textile substrate.

18. The thermoformable decorative material according to claim 16, wherein the adhesive comprises amorphous polyacrylate and/or polyurethane.

19. The thermoformable decorative material according to claim 16, wherein the polyacrylate and/or polyurethane has a glass transition temperature of less than 0° C. measured according to DIN EN ISO 11357-2 (2014, heating rate: 20 K/min).

20. The thermoformable decorative material according to claim 16, wherein the textile substrate comprises a nonwoven fabric.

* * * * *